(12) United States Patent
Kasuga

(10) Patent No.: US 6,354,627 B1
(45) Date of Patent: Mar. 12, 2002

(54) CONSTRUCTION FOR SUSPENSION SYSTEM MOUNTING PORTIONS OF BODY OF VEHICLE

(75) Inventor: Tatsuo Kasuga, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/650,651

(22) Filed: Aug. 30, 2000

(30) Foreign Application Priority Data

Aug. 30, 1999 (JP) .......................................... 11-242589

(51) Int. Cl.[7] .............................................. B62D 21/02
(52) U.S. Cl. ...................................... 280/781; 280/796
(58) Field of Search ................................ 280/781, 796

(56) References Cited

FOREIGN PATENT DOCUMENTS

| JP | 6-99845 | * | 4/1992 |
|----|---------|---|--------|
| JP | 6-179378 | * | 6/1994 |

* cited by examiner

*Primary Examiner*—Eric Culbreth
(74) *Attorney, Agent, or Firm*—Sughrue Mion, PLLC

(57) ABSTRACT

There is provided a construction for suspension system mounting portions of the body of a vehicle characterized in that a closed cross-sectional portion (19) extending in a transverse direction of the body of the vehicle is formed with a plurality of sheet materials (a front dash panel 1 and a dash panel lower cross member 7) which are each pressed into shapes, that an extruded beam member (a reinforcement beam 17) is caused to extend into the interior of the closed cross-sectional portion, die-cast suspension arm brackets (6) are welded to an external surface of the closed cross-sectional portion with a part thereof (protruding portions 15a, 15b) being caused to protrude into the interior of the closed cross-sectional portion, and that the beam member is welded to the protruding portions. This can provide high rigidity without involving the complexity in shaping the respective members constituting the closed cross-sectional portion. In addition, the breaking strength of the suspension system mounting portions against the repeated stress can further be improved by a combination of the pressed members having high toughness and the cast members having high rigidity.

7 Claims, 4 Drawing Sheets

CONSTRUCTION FOR SUSPENSION SYSTEM MOUNTING PORTIONS OF BODY OF VEHICLE

BACKGROUND OF THE INVENTION

The present invention relates to a construction for suspension system mounting portions of the body of a vehicle.

Suspension system mounting portions of the monocoque-structured body of a vehicle are generally provided on a cross member having a closed hollow cross-section formed by assembling sheet materials that are pressed into shapes.

According to the above construction, however, since the suspension system mounting portion is formed using a plurality of relatively thin sheet materials, in order to secure a sufficient rigidity, the configurations of members constituting the cross member tend to become complicated, and this directly leads to complicated production processes.

Although a sub-frame system is known in which the support portions of the suspension systems are provided separately from the body of the vehicle, even with this system, it is inevitable that the weight and production costs of the vehicle increase.

SUMMARY OF THE INVENTION

The present invention was devised to solve the inconvenience inherent in the prior art described above, and a main object thereof is to provide a construction for suspension system mounting portions of the body of a vehicle which is simple and provides high rigidity.

The above-mentioned object can be achieved by a construction for suspension system mounting portions of the body of a vehicle, according to the present invention, comprising a closed cross-sectional portion, an extruded beam member and a die-cast suspension arm bracket member. The closed cross-sectional portion is extended in a transverse direction of the body of the vehicle and is formed with a plurality of sheet materials which are each pressed into shapes. The extruded beam member is extended into the interior of the closed cross-sectional portion in the transverse direction. The die-cast suspension arm bracket member is welded to an external surface of the closed cross-sectional portion and has a protruding part. The protruding part is protruded into the interior of the closed cross-sectional portion and is welded to the extruded beam member.

In addition, with a view to attaining the aforesaid object, according to the invention, there is provided a construction for suspension system mounting portions of the body of a vehicle characterized in that a closed cross-sectional portion extending in a transverse direction of the body of the vehicle is formed with a plurality of sheet materials (for example, a front dash panel and a dash panel lower cross member) which are each pressed into shapes, that an extruded beam member (as a reinforcement beam) is caused to extend into the interior of the closed cross-sectional portion, die-cast suspension arm brackets are welded to an external surface of the closed cross-sectional portion with apart thereof (for example, protruding portions) being caused to protrude into the interior of the closed cross-sectional portion, and that the beam member is welded to the protruding portions.

With this construction, high rigidity can be obtained without resulting in the complexity in shaping the respective constituent members of the closed cross-sectional portion formed with the sheet materials which are pressed into shapes by disposing the beam member formed of the extruded material in the interior of the closed cross-sectional portion. In addition, the breaking strength against repeated stress of the suspension system mounting portion can further be improved by a combination of the pressed members having high toughness and the die-cast members having high rigidity.

DETAILED DESCRIPTION OF THE PREFERRED EMBODIMENTS

Referring to the accompanying drawings, the invention will be described in detail below.

Figure 1:
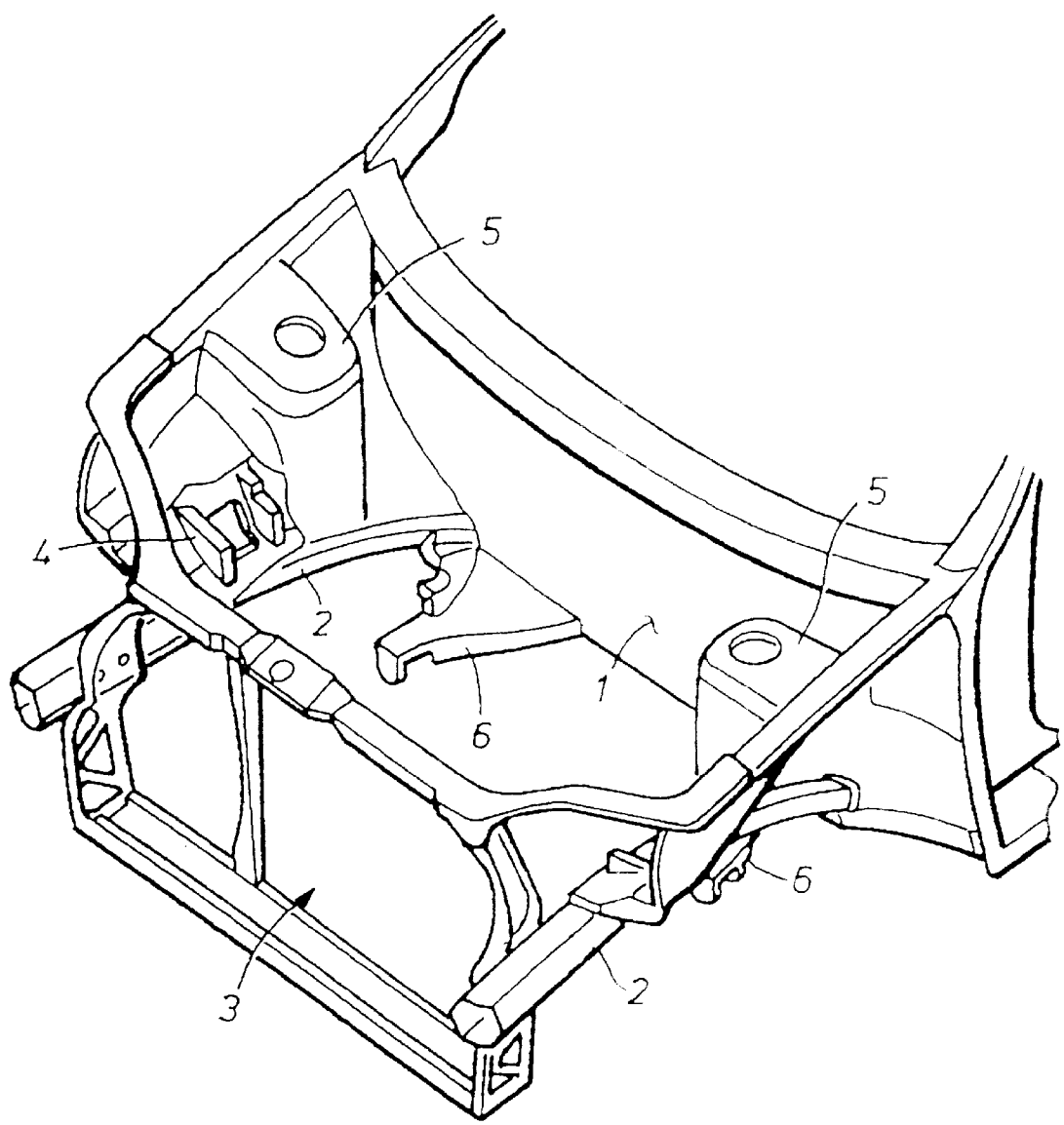
FIG. 1 shows a perspective view of a front body frame of the vehicle according to the invention.

FIG. 1 shows a front part of the body frame of an automotive vehicle according to the invention. This body frame is assembled by connecting various types of members formed of aluminum alloy to each other and comprises a pair of front side frames connected to a lower portion of a front dash panel 1 at rear ends thereof and extending forward therefrom and a front bulkhead 3 connected to front end portions of both the front side frames 2.

Both the front side frames 2 each comprise an extruded hollow member having a hexagonal contour and are curved with a suitable radius of curvature such that a concave faces downwardly so as to avoid any interference with the front axle, and an engine mount bracket 4 and a strut tower 5 are connected to each front side frame 2 at suitable positions.

Figure 2:
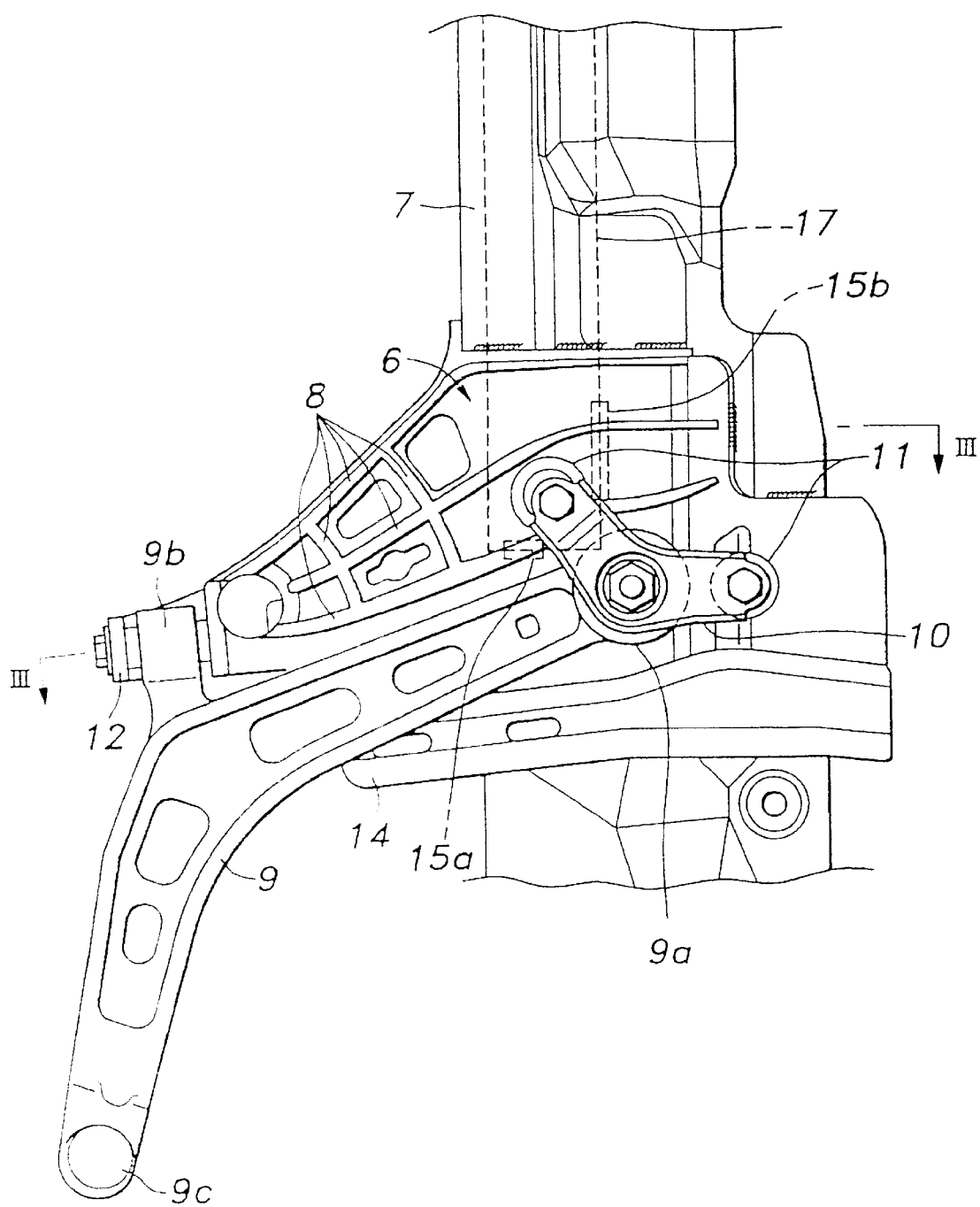
FIG. 2 shows a bottom view of a suspension arm mounting portion.
Figure 3:
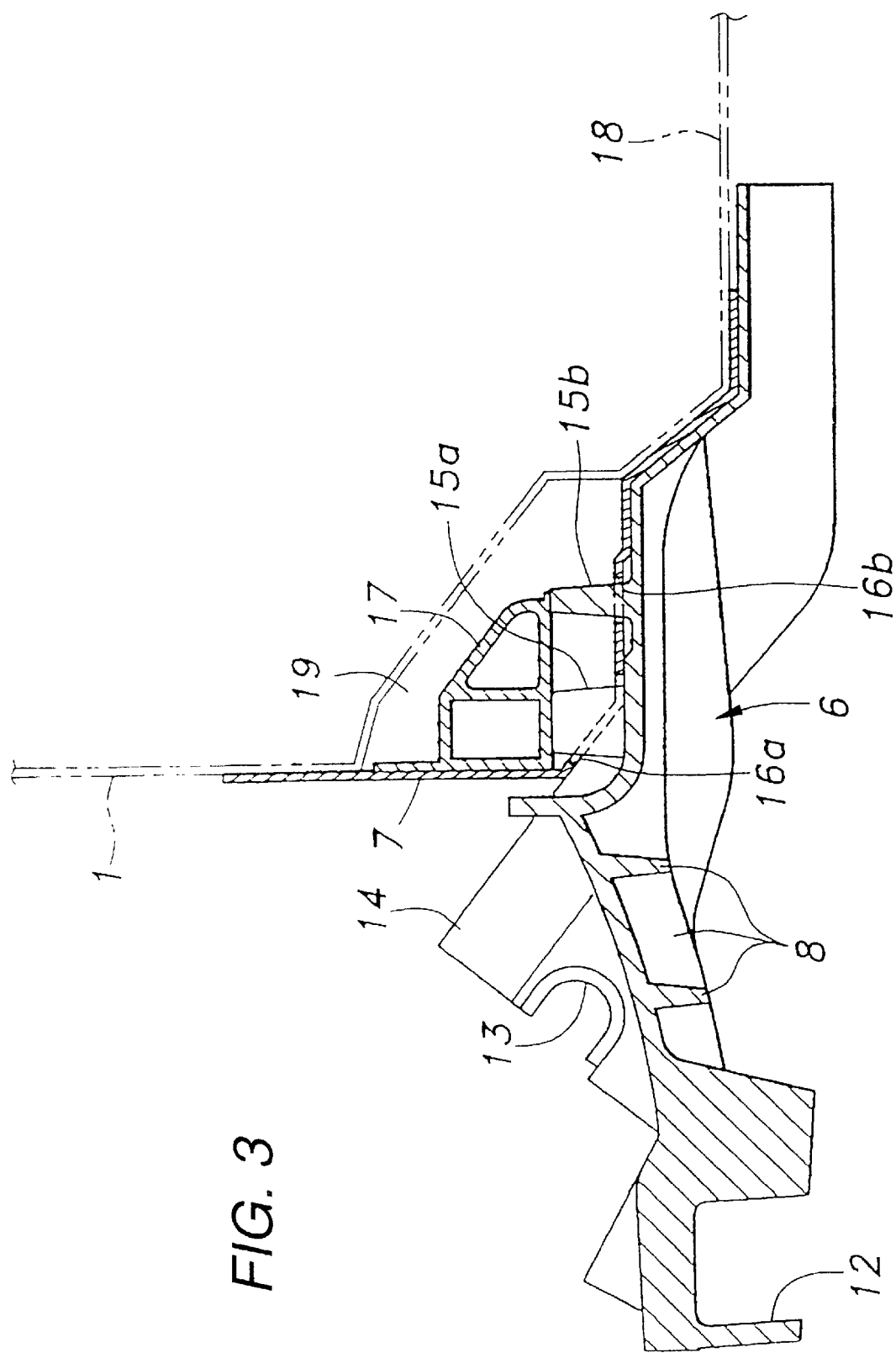
FIG. 3 shows a cross-sectional view taken along the line III—III of FIG. 2.

On the other hand, as shown in FIGS. 2 and 3 collectively, a pair of left and right front suspension arm brackets 6 are connected to a lower part of the front dash panel 1 which is constituted by a sheet material which is pressed into shapes via a dash panel lower cross member 7 which is constituted by sheet materials pressed into shapes. Then, the rear ends of the aforesaid front side frames 2 are connected to external side portions of these suspension arm brackets 6.

The suspension arm bracket 6 is formed through die casting, and the expected rigidity is designed to be imparted with ribs 8 provided suitably. Integrally formed with the suspension arm bracket 6 are a connecting portion 11 with a support plate 10 for supporting around a vertical axis one end 9a of a suspension arm 9 die cast into a generally arch-like curved shape, a bearing portion 12 for supporting around a horizontal axis an intermediate portion 9b of the suspension arm 9, a stabilizer bar supporting portion 13 and a front side frame connecting portion 14 or the like.

Note that a lower end of a damper strut is coupled to a free end 9c of the suspension arm 9 via a ball joint, not shown.

The suspension arm brackets 6 are welded to a bottom side of the dash panel lower cross member 7. Here, two projections 15a, 15b are formed on a top side of the suspension arm bracket 6, namely a joining side thereof with the dash panel lower cross member 7 in such a manner as to be dividedly disposed on straight lines intersecting with each other at right angles. These projections 15a, 15b protrude upwardly into the dash panel lower cross member 7 through holes 16a, 16b formed in the dash panel lower cross member 7. Then, respective ends of a reinforcement beam 17 comprising an extruded hollow member are welded to the projections 15a, 15b of the respective suspension arm brackets 6.

The relative positioning of the suspension arm brackets 6 and the dash panel lower cross member 7 or positioning of the suspension arm brackets 6 relative to the body of the vehicle can be effected accurately and easily by bringing the two projections 15a, 15b of the respective suspension arm brackets 6 and the holes 16a, 16b formed in the dash panel lower cross member 7 at the corresponding positions thereof into engagement with each other, as described above.

Thus, a closed cross-sectional portion 19 incorporating therein the reinforcement beam 17 and extending in a transverse direction of the vehicle is formed by welding the dash panel lower cross member 7 to which the suspension arm brackets 6 and the reinforcement beam 17 are already welded to a joint portion between the front dash panel 1 and a front floor 18.

Figure 4:
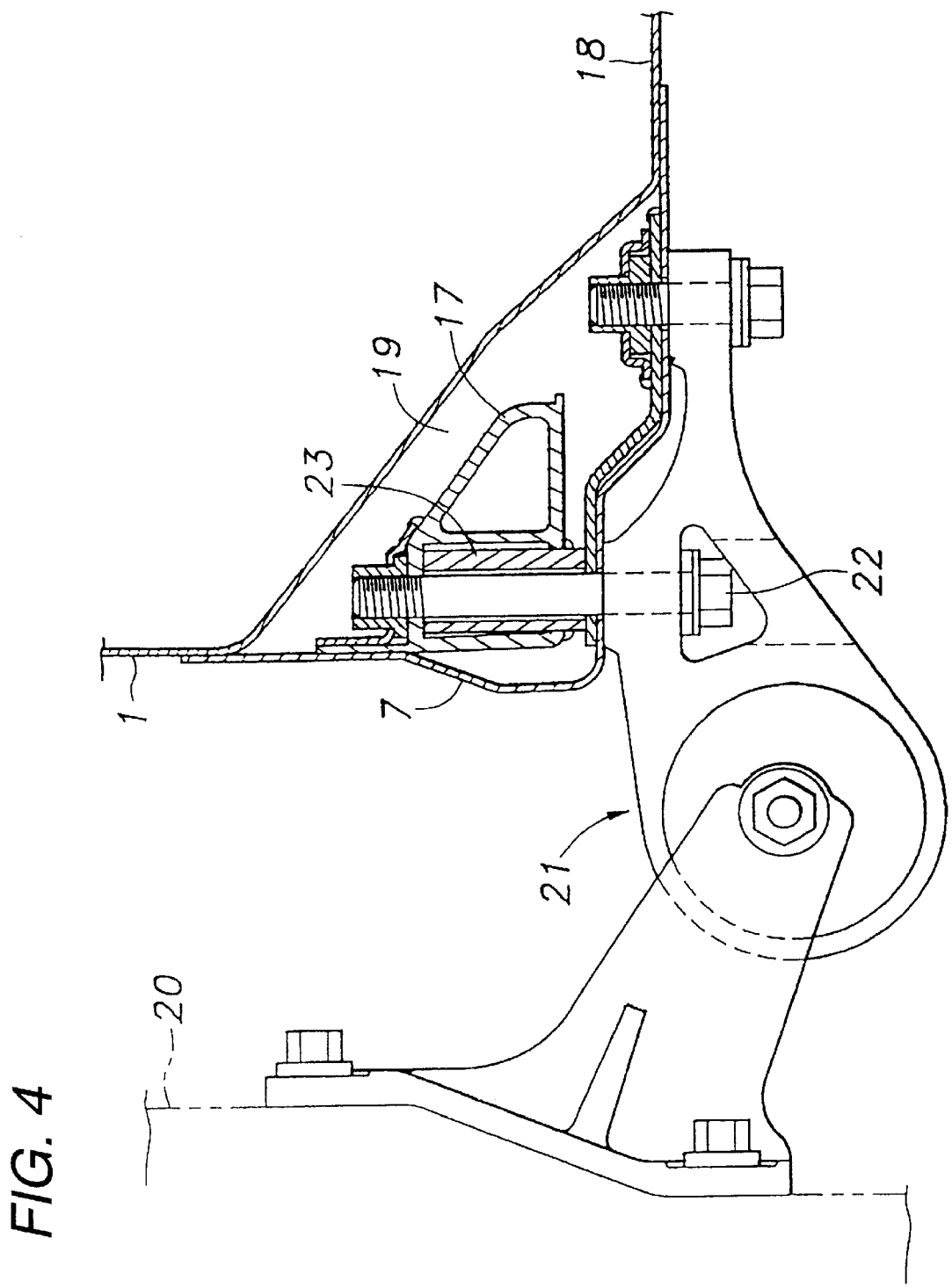
FIG. 4 shows a vertical cross-sectional view of a portion where a mount bracket is attached.

Since a member having high rigidity which extends between the left and right suspension arm brackets 6 is provided by the reinforcement beam 17 provided inside the closed cross-sectional portion 19 formed as described above, as shown in FIG. 4, the member can be used as an attachment portion for a mount bracket 21 for coupling a transmission 20 integrally connected to an engine. Note that in this case, when the hollow reinforcement beam 17 is fastened together with the mount bracket 21 with a through bolt 22, there is caused a risk of the cross section of the reinforcement beam 17 being deformed by virtue of an axial force exerted by the tightened bolt, and therefore the axial force of the bolt 22 is designed to be received by a collar 23 welded to the reinforcement beam 17.

As has been described heretofore, according to the invention, with the construction in which the left and right supporting members (such as a suspension arm brackets 6) are formed of the die-cast material having high rigidity, in which these supporting members are connected to each other by the beam member (such as a reinforcement beam) of the extruded material, and in which these supporting members and the beam member are connected to the closed cross-sectional portion formed by the pressed materials having high toughness (such as a front dash panel and a dash panel lower cross member), the construction of the suspension system mounting portions of the body of the vehicle can be provided which provides a higher breaking strength against the repeated stress and superior NVH (noise vibration harshness) properties, as well as other tremendous advantages.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A construction for suspension system mounting portions of a body of a vehicle comprising:

a closed cross-sectional member extended in a transverse direction of the body of said vehicle and formed with a plurality of sheet materials which are respectively pressed into predetermined shapes;

an extruded beam member extended into the interior of said closed cross-sectional member in the transverse direction; and at least one die cast suspension arm bracket member welded to an external surface of said closed cross-sectional member and having a protruding part which is protruded into the interior of said closed cross-sectional member and is welded to said extruded beam member.

2. The construction for suspension system mounting portions according to claim 1, wherein said plurality of sheet materials forming said closed cross-sectional member comprises a front dash panel and a dash panel lower cross member, and wherein said die-cast suspension arm bracket member is welded to the external surface of a lower part of said front dash panel.

3. The construction for suspension system mounting portion according to claim 2, wherein said protruding part of said die-cast suspension arm bracket member is protruded into the interior of said closed cross-sectional member through a through hole which is formed in said dash panel lower cross member.

4. The construction for suspension system mounting portions according to claim 1, wherein said protruding part comprises a first protruding element extending in a first direction and a second protruding element extending in a second direction different from the first direction.

5. The construction for suspension system mounting portions according to claim 1, wherein said extruded beam member is formed into a hollow shape.

6. The construction for suspension system mounting portions according to claim 1, wherein said at least one die-cast suspension arm bracket member comprises right and left suspension arm brackets, and said extruded beam member is interposed between said right and left suspension arm brackets.

7. The construction for suspension system mounting portions according to claim 1, further comprising:

a collar welded to said extruded beam member for supporting a transmission mount bracket through a bolt which is inserted into said collar.

* * * * *